United States Patent
Ramasubramonian et al.

(10) Patent No.: US 9,848,199 B2
(45) Date of Patent: Dec. 19, 2017

(54) DEVICE AND METHOD FOR SCALABLE CODING OF VIDEO INFORMATION

(71) Applicant: QUALCOMM Incorporated, San Diego, CA (US)

(72) Inventors: Adarsh Krishnan Ramasubramonian, San Diego, CA (US); Fnu Hendry, Poway, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/656,447

(22) Filed: Mar. 12, 2015

(65) Prior Publication Data
US 2015/0264369 A1    Sep. 17, 2015

Related U.S. Application Data

(60) Provisional application No. 61/954,545, filed on Mar. 17, 2014, provisional application No. 61/955,140, filed on Mar. 18, 2014.

(51) Int. Cl.
*H04N 7/12* (2006.01)
*H04N 11/02* (2006.01)
*H04N 11/04* (2006.01)
*H04N 19/31* (2014.01)
*H04N 19/184* (2014.01)
*H04N 19/187* (2014.01)
*H04N 19/136* (2014.01)
(Continued)

(52) U.S. Cl.
CPC ........... *H04N 19/31* (2014.11); *H04N 19/136* (2014.11); *H04N 19/184* (2014.11); *H04N 19/187* (2014.11); *H04N 19/30* (2014.11); *H04N 19/70* (2014.11)

(58) Field of Classification Search
CPC ........ H04N 19/31; H04N 19/30; H04N 19/70; H04N 19/184; H04N 19/136; H04N 19/187; H04N 19/46
USPC ..................................................... 375/240.25
See application file for complete search history.

(56) References Cited

U.S. PATENT DOCUMENTS

2015/0208064 A1* 7/2015 Samuelsson ......... H04N 19/105
375/240.12

OTHER PUBLICATIONS

High efficiency video coding (HEVC) text specification draft 8; Jul. 20, 2012; Bross, Woo-Jin, Jens-Rainer, Sullivan, Wiegand.*

(Continued)

*Primary Examiner* — Jared Walker
(74) *Attorney, Agent, or Firm* — Knobbe, Martens, Olson & Bear, LLP

(57) ABSTRACT

An apparatus configured to code video information in a bitstream includes a memory and a processor in communication with the memory. The memory is configured to store video information associated with a video layer having a current picture. The processor is configured to: determine whether a slice segment header extension associated with the current picture is present in the bitstream; and determine that one or more most significant bits (MSBs) of a picture order count (POC) value associated with the current picture are not present in the bitstream in response to a determination that the slice segment header extension associated with the current picture is not present in the bitstream. The processor may encode or decode the video information in the bitstream.

30 Claims, 10 Drawing Sheets

(51) Int. Cl.
*H04N 19/70* (2014.01)
*H04N 19/30* (2014.01)

(56) References Cited

OTHER PUBLICATIONS

Chen J., et al., "High efficiency video coding (HEVC) scalable extensions Draft 5", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P1008-v4, Jan. 22, 2014 (Jan. 22, 2014), 125 Pages, XP030115882.

Hendry, et al., "MV-HEVC/SHVC HLS: On picture order count", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0041-v6, Jan. 2, 2014 (Jan. 2, 2014), XP030115502, pp. 12.

Ikai T., et al., "MV-HEVC/SHVC HLS: On slice segment header extension", 14. JCT-VC Meeting; Jul. 25, 2013-Aug. 2, 2013; Vienna; (Joint Collaborative Team on Video Coding of ISO/IEC JTC1/SC29/WG11 and ITU-TSG.16); URL:http://wftp3.itu.int/av-arch/jctvc-Site/,, No. JCTVC-N0059-v2, Jul. 25, 2013 (Jul. 25, 2013), XP030114491, 6 pages.

International Search Report and Written Opinion—PCT/US2015/020469—ISA/EPO—Jun. 11, 2015.

Ramasubramonian A.K., et al., "MV-HEVC/SHVC HLS: On picture order count and related,"; 17. JCT-VC MEETING; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/,, No. JCTVC-Q0146, Mar. 18, 2014 (Mar. 18, 2014), XP030116080, pp. 5.

Tech G., et al., "MV-HEVC Draft Text 8," 8.JCT-3V Meeting; Mar. 29, 2014-Apr. 4, 2014; Valencia; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-H1002-V1, Apr. 8, 2014 (Apr. 8, 2014), XP030132291, 132 pages.

* cited by examiner

DEVICE AND METHOD FOR SCALABLE CODING OF VIDEO INFORMATION

INCORPORATION BY REFERENCE TO PRIORITY APPLICATIONS

This application claims priority to U.S. Provisional No. 61/954,545, filed Mar. 17, 2014, and U.S. Provisional No. 61/955,140, filed Mar. 18, 2014.

TECHNICAL FIELD

This disclosure relates to the field of video coding and compression, particularly to scalable video coding, multiview video coding, or three-dimensional (3D) video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

The systems, methods and devices of this disclosure each have several innovative aspects, no single one of which is solely responsible for the desirable attributes disclosed herein.

In one aspect, an apparatus configured to code (e.g., encode or decode) video information in a bitstream includes a memory and a processor in communication with the memory. The memory is configured to store video information associated with a video layer having a current picture. The processor is configured to: determine whether a slice segment header extension associated with the current picture is present in the bitstream; and determine that one or more most significant bits (MSBs) of a picture order count (POC) value associated with the current picture are not present in the bitstream in response to a determination that the slice segment header extension associated with the current picture is not present in the bitstream.

In another aspect, a method of coding video information in a bitstream includes: determining whether a slice segment header extension associated with a current picture in a video layer is present in the bitstream; and determining that one or more most significant bits (MSBs) of a picture order count (POC) value associated with the current picture are not present in the bitstream in response to a determination that the slice segment header extension associated with the current picture is not present in the bitstream.

In another aspect, a non-transitory computer readable medium contains code that, when executed, causes an apparatus to perform a process. The process includes: storing video information associated with a video layer having a current picture; determining whether a slice segment header extension associated with the current picture is present in a bitstream; and determining that one or more most significant bits (MSBs) of a picture order count (POC) value associated with the current picture are not present in the bitstream in response to a determination that the slice segment header extension associated with the current picture is not present in the bitstream.

In another aspect, a video coding device configured to code video information in a bitstream includes: means for storing video information associated with a video layer having a current picture; means for determining whether a slice segment header extension associated with the current picture is present in the bitstream; and means for determining that one or more most significant bits (MSBs) of a picture order count (POC) value associated with the current picture are not present in the bitstream in response to a determination that the slice segment header extension associated with the current picture is not present in the bitstream.

DETAILED DESCRIPTION

Figure 1A:
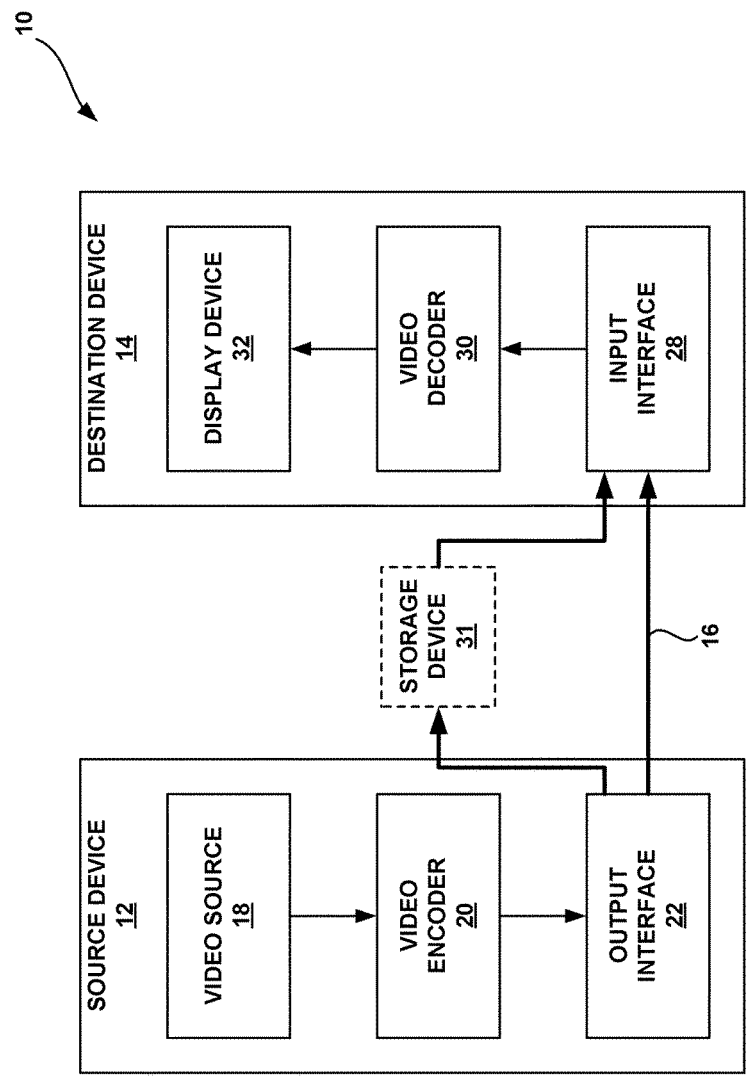
FIG. 1A is a block diagram illustrating an example video encoding and decoding system that may utilize techniques in accordance with aspects described in this disclosure.

In general, this disclosure relates to picture order count (POC) management for multi-layer video coding in the context of advanced video codecs, such as High Efficiency Video Coding (HEVC). More specifically, the present disclosure relates to systems and methods for improved performance of inter-layer prediction in scalable video coding extension of HEVC referred to as SHVC.

Scalable video coding refers to video coding in which a base layer (BL), sometimes referred to as a reference layer (RL), and one or more scalable enhancement layers (ELs) are used. In scalable video coding, the BL can carry video data with a base level of quality. The one or more ELs can carry additional video data to support, for example, higher spatial, temporal, and/or signal-to-noise ratio (SNR) levels. ELs may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the BL or any intervening ELs, and at the same time serve as an RL for one or more ELs above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In some implementations, when a single-layer bitstream (e.g., a bitstream containing only one layer of video information) is processed by a multi-layer decoder (e.g., a decoder that is configured to process single-layer bitstreams and configured to process multi-layer bitstreams), the multi-layer decoder may incorrectly determine that the single-layer bitstream is a non-conformant bitstream (e.g., a bitstream that is not generated in compliance with one or more applicable standards) based on the absence of some information that the multi-layer decoder may be expecting (i.e., the multi-layer decoder is configured to receive and process) in the bitstream. For example, a multi-layer bitstream may contain pictures that are in the same access unit but associated with picture order count (POC) values that have different least significant bits (LSBs). Typically, such non-alignment of POC LSBs may be indicated by a flag (e.g., vps_poc_lsb_aligned_flag) provided in the multi-layer bitstream. The multi-layer decoder may be configured to, upon determining the multi-layer bitstream contains non-aligned POC LSBs, process one or more most significant bits (MSBs) of the POC values that are provided in the multi-layer bitstream. If the multi-layer decoder does not find any MSBs of the POC values in the expected or predetermined location in the multi-layer bitstream (e.g., in the slice segment header extensions associated with such pictures), the multi-layer decoder may correctly conclude that the multi-layer bitstream does not conform to the applicable video coding standards (e.g., Scalable High Efficiency Video Coding (SHVC)).

On the other hand, a single-layer bitstream (e.g., an HEVC-encoded bitstream containing only one video layer) may not contain any information relevant to the scalability extensions to HEVC such as video parameter set (VPS) extensions that would typically contain the above-mentioned flag indicating whether the bitstream may contain non-aligned POC LSBs. Thus, when processing such a single-layer bitstream, the multi-layer decoder may assume (i.e., determine), based on the absence of such a flag indicating whether the bitstream may contain non-aligned POC LSBs, that the single-layer bitstream contains non-aligned POC LSBs. As discussed above, based on this determination, the multi-layer decoder may expect to receive the one or more MSBs of the POC values included in the bitstream. When the multi-layer decoder determines that the single-layer bitstream does not contain the one or more MSBs of the POC values (e.g., which may be provided in the slice segment header extensions that are typically not included in a single-layer bitstream) that the multi-layer decoder seeks to find, the multi-layer decoder may determine that the single-layer bitstream, which does not contain non-aligned POC LSBs and thus does not need MSBs of the POC values to be signaled therein, is a non-conformant bitstream, even though the single-layer bitstream may in fact be a conformant bitstream (e.g., a bitstream that conforms to one or more applicable standards).

Thus, an improved method for determining the presence of POC MSBs in a bitstream is desired.

In the present disclosure, various techniques for determining (or inferring) whether POC MSBs are signaled in the bitstream are described. In some embodiments of the present disclosure, the coder determines whether POC MSBs associated with a picture are signaled in the bitstream based on the presence in the bitstream of slice segment header extensions. By basing the determination of whether POC MSBs associated with a picture are signaled in the bitstream on the presence of the slice segment header extension associated with the picture, the coder can avoid an incorrect expectation of POC MSBs being signaled in the bitstream when processing a single-layer bitstream.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards (e.g., including standards developed by International Telecommunication Union Telecommunication Standardization Sector [ITU-T] Video Coding Experts Group [VCEG] or International Organization for Standardization/International Electrotechnical Commission [ISO/IEC] Moving Pictures Experts Group [MPEG]): ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from the units of prediction (e.g., macroblocks) in certain previous video coding standards. In fact, the concept of macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as a BL, and a higher layer such as an EL) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. For example, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple BLs, RLs, and/or ELs. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a video coding standard, namely HEVC, is being developed by the Joint Collaboration Team on Video Coding (JCT-VC) of ITU-T VCEG and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
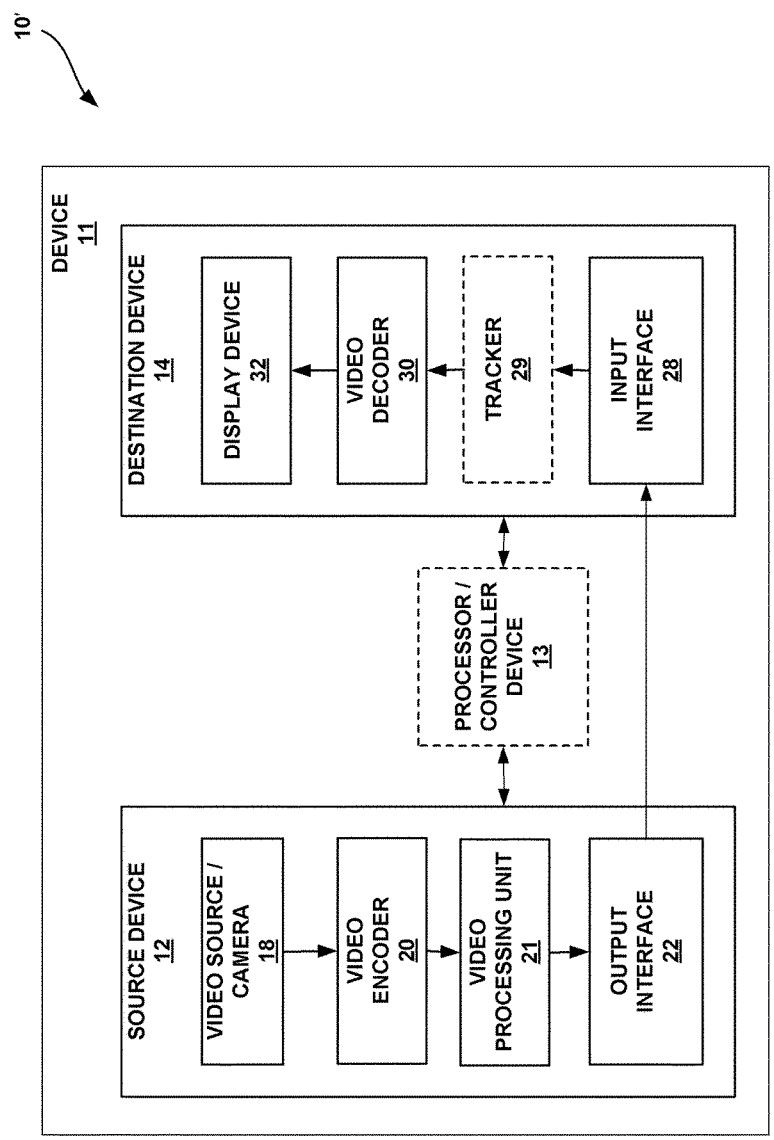
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 are on separate devices—specifically, the source device 12 is part of a source device, and the destination device 14 is part of a destination device. It is noted, however, that the source and destination devices 12, 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via a link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data directly to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an optional storage device 31. Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network [WLAN] connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hyper-text Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, a video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by video encoder 20. The encoded video data may be transmitted directly to the destination device 14 via the output interface 22 of the source device 12. The encoded video data may also (or alternatively) be stored onto the storage device 31 for later access by the destination device 14 or other devices, for decoding and/or playback. video encoder 20 illustrated in FIGS. 1A and 1B may comprise video encoder 20 illustrated FIG. 2A, video encoder 23 illustrated in FIG. 2B, or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server. Video decoder 30 illustrated in FIGS. 1A and 1B may comprise video decoder 30 illustrated FIG. 3A, video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination devices 12, 14 are on or part of a device 11. The device 11 may be a telephone handset, such as a "smart" phone or the like. The device 11 may include an optional processor/controller device 13 in operative communication with the source and destination devices 12, 14. The system 10' of FIG. 1B may further include a video processing unit 21 between video encoder 20 and the output interface 22. In some implementations, the video processing unit 21 is a separate unit, as illustrated in FIG. 1B; however, in other implementations, the video processing unit 21 can be implemented as a portion of video encoder 20 and/or the processor/controller device 13. The system 10' may also include an optional tracker 29, which can track an object of interest in a video sequence. The object of interest to be tracked may be segmented by a technique described in connection with one or more aspects of the present disclosure. In related aspects, the tracking may be performed by the display device 32, alone or in conjunction with the tracker 29. The system 10' of FIG. 1B, and components thereof, are otherwise similar to the system 10 of FIG. 1A, and components thereof.

Video encoder 20 and video decoder 30 may operate according to a video compression standard, such as HEVC standard, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (e.g., codec) in a respective device.

Video Coding Process

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPSs), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as context adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2A:
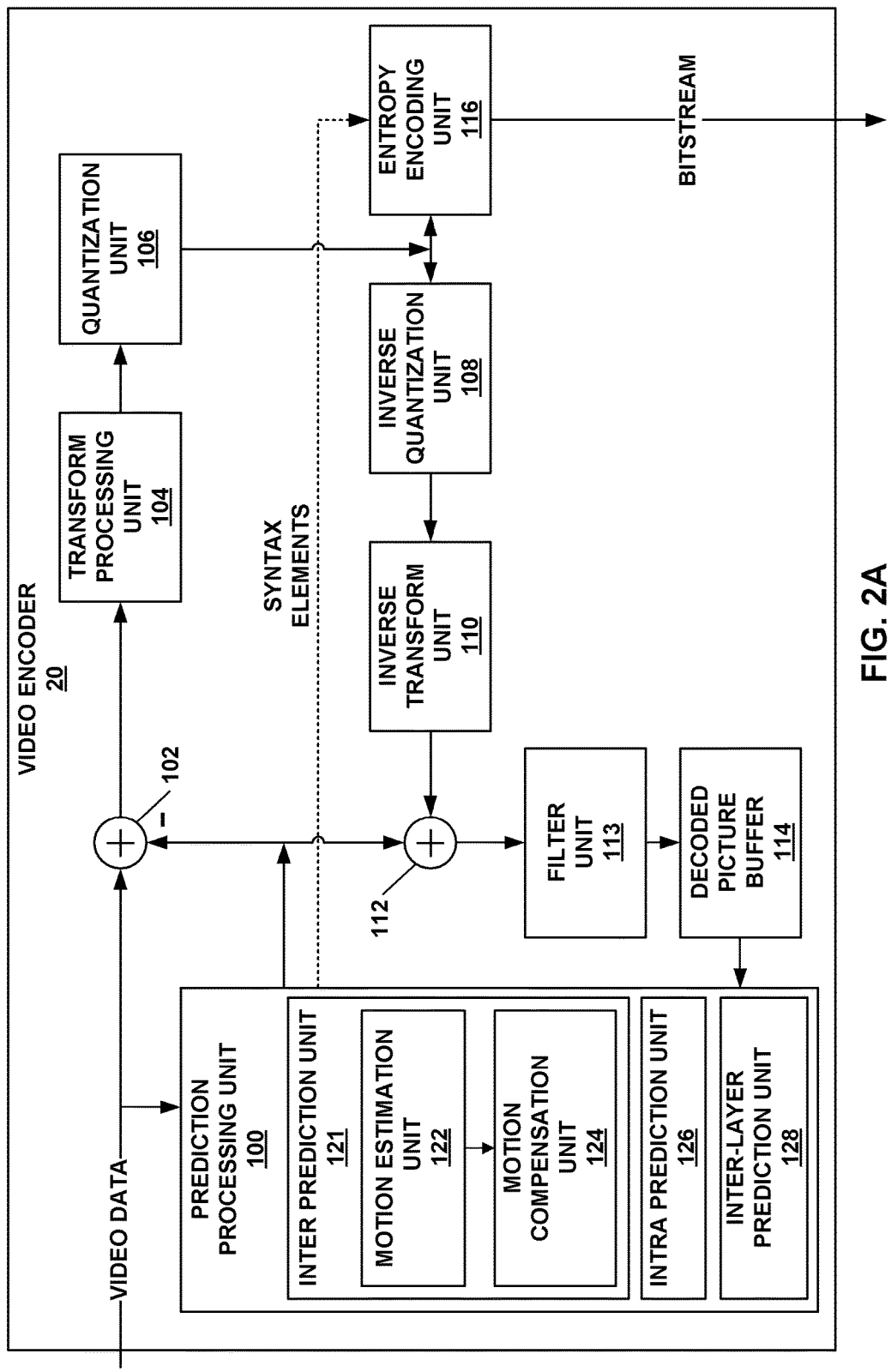
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video frame, such as for HEVC. Further, video encoder 20 may be configured to perform any or all of the techniques of this disclosure. As one example, prediction processing unit 100 may be configured to perform any or all of the techniques described in this disclosure. In another embodiment, video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of video encoder 20 may be duplicated for processing of a multi-layer codec.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2A separately for purposes of explanation.

Video encoder 20 may receive video data. Video encoder 20 may receive the video data from various sources. For example, video encoder 20 may receive the video data from video source 18 (e.g., shown in FIG. 1A or 1B) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As further discussed below with reference to FIG. 4, the prediction processing unit 100 may be configured to code (e.g., encode or decode) the PU (or any other RL and/or EL blocks or video units) by performing the methods illustrated in FIG. 4. For example, inter prediction unit 121 (e.g., via motion estimation unit 122 and/or motion compensation unit 124), intra prediction unit 126, or inter-layer prediction unit 128 may be configured to perform the methods illustrated in FIG. 4, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, video encoder 20 may include inter-layer prediction unit 128. Inter-layer prediction unit 128 is configured to predict a current block (e.g., a current block in the EL) using one or more different layers that are available in scalable video coding (e.g., a BL or RL). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the BL to predict the current block in the EL. Inter-layer motion prediction uses motion information of the BL to predict motion in the EL. Inter-layer residual prediction uses the residue of the BL to predict the residue of the EL. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
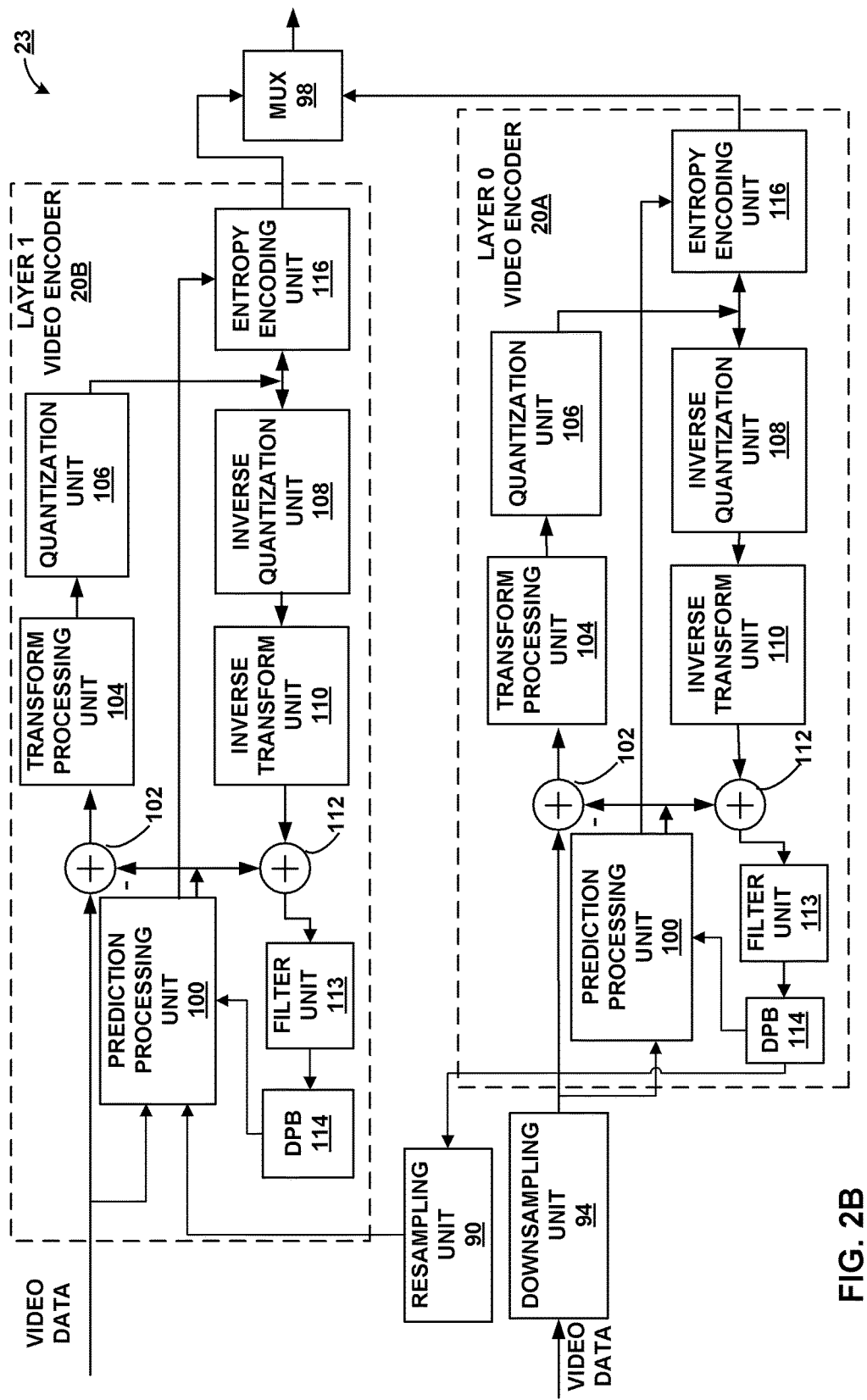
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. Video encoder 23 may be configured to process multi-layer video frames, such as for SHVC and multiview coding. Further, video encoder 23 may be configured to perform any or all of the techniques of this disclosure.

Video encoder 23 includes a video encoder 20A and video encoder 20B, each of which may be configured as video encoder 20 and may perform the functions described above with respect to video encoder 20. Further, as indicated by the reuse of reference numbers, video encoders 20A and 20B may include at least some of the systems and subsystems as video encoder 20. Although video encoder 23 is illustrated as including two video encoders 20A and 20B, video encoder 23 is not limited as such and may include any number of video encoder 20 layers. In some embodiments, video encoder 23 may include a video encoder 20 for each picture or frame in an access unit. For example, an access unit that includes five pictures may be processed or encoded by a video encoder that includes five encoder layers. In some embodiments, video encoder 23 may include more encoder layers than frames in an access unit. In some such cases, some of the video encoder layers may be inactive when processing some access units.

In addition to video encoders 20A and 20B, video encoder 23 may include an resampling unit 90. The resampling unit 90 may, in some cases, upsample a BL of a received video frame to, for example, create an EL. The resampling unit 90 may upsample particular information associated with the received BL of a frame, but not other information. For example, the resampling unit 90 may upsample the spatial size or number of pixels of the BL, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a BL, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., video encoder 20A) and to upsample the picture (or the received picture information). This upsampled picture may then be provided to the prediction processing unit 100 of a higher layer encoder (e.g., video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of video encoder 20A may be provided directly, or at least without being provided to the resampling unit 90, to the prediction processing unit 100 of video encoder 20B. For example, if video data provided to video encoder 20B and the reference picture from the decoded picture buffer 114 of video encoder 20A are of the same size or resolution, the reference picture may be provided to video encoder 20B without any resampling.

In some embodiments, video encoder 23 downsamples video data to be provided to the lower layer encoder using the downsampling unit 94 before provided the video data to video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, video encoder 23 may further include a multiplexor 98, or mux. The mux 98 can output a combined bitstream from video encoder 23. The combined bitstream may be created by taking a bitstream from each of video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of video encoders 20A and 20B. For instance, two blocks may be output from video encoder 20B for each block output from video encoder 20A. In some embodiments, the output stream from the mux 98 may be preprogrammed. In other embodiments, the mux 98 may combine the bitstreams from video encoders 20A, 20B based on a control signal received from a system external to video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from video encoder 23.

Video Decoder

Figure 3A:
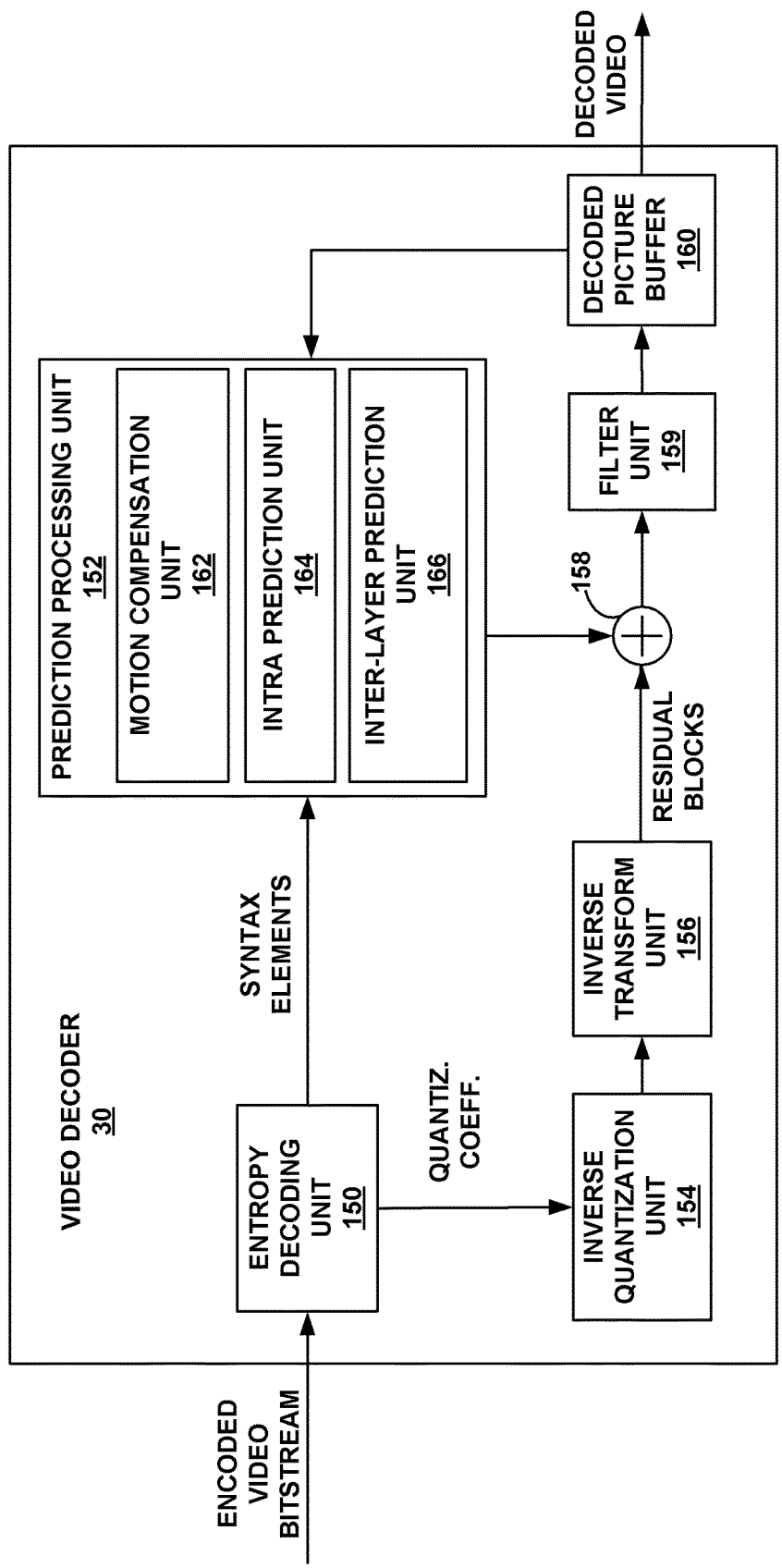
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. Video decoder 30 may be configured to process a single layer of a video frame, such as for HEVC. Further, video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of video decoder 30 may be duplicated for processing of a multi-layer codec.

In the example of FIG. 3A, video decoder 30 includes a plurality of functional components. The functional components of video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2A. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

As further discussed below with reference to FIG. 4, the prediction processing unit 152 may code (e.g., encode or decode) the PU (or any other RL and/or EL blocks or video units) by performing the methods illustrated in FIG. 4. For example, motion compensation unit 162, intra prediction unit 164, or inter-layer prediction unit 166 may be configured to perform the methods illustrated in FIG. 4, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in scalable video coding (e.g., a BL or RL). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the BL to predict the current block in the EL. Inter-layer motion prediction uses motion information of the BL to predict motion in the EL. Inter-layer residual prediction uses the residue of the BL to predict the residue of the EL. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, video decoder 30 may perform, based on the video blocks in decoded picture buffer 160, intra prediction or inter prediction operations on PUs of other CUs.

Multi-Layer Decoder

Figure 3B:
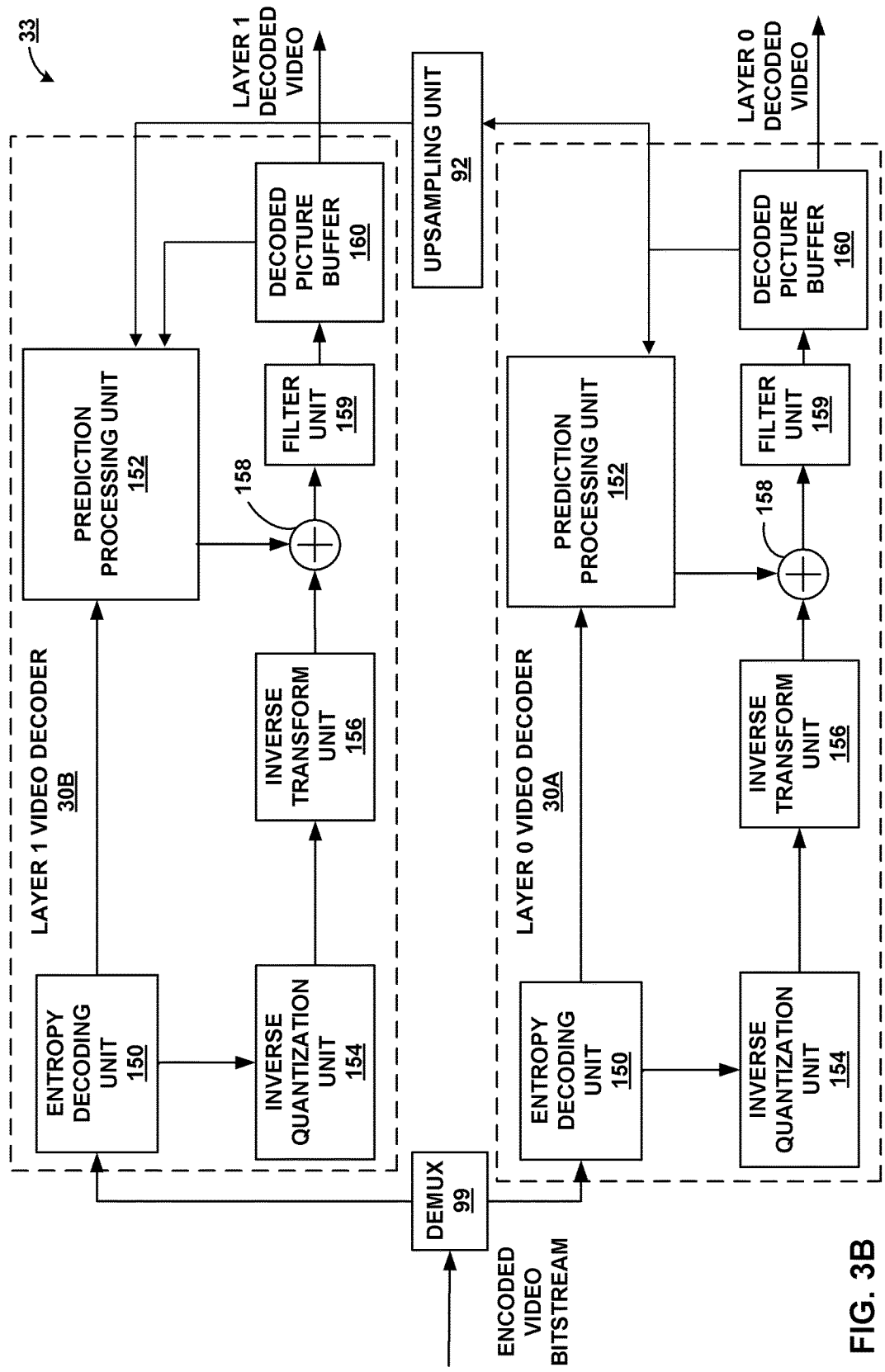
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. Video decoder 33 may be configured to process multi-layer video frames, such as for SHVC and multiview coding. Further, video decoder 33 may be configured to perform any or all of the techniques of this disclosure.

Video decoder 33 includes a video decoder 30A and video decoder 30B, each of which may be configured as video decoder 30 and may perform the functions described above with respect to video decoder 30. Further, as indicated by the reuse of reference numbers, video decoders 30A and 30B may include at least some of the systems and subsystems as video decoder 30. Although video decoder 33 is illustrated as including two video decoders 30A and 30B, video decoder 33 is not limited as such and may include any number of video decoder 30 layers. In some embodiments, video decoder 33 may include a video decoder 30 for each picture or frame in an access unit. For example, an access unit that includes five pictures may be processed or decoded by a video decoder that includes five decoder layers. In some embodiments, video decoder 33 may include more decoder layers than frames in an access unit. In some such cases, some of the video decoder layers may be inactive when processing some access units.

In addition to video decoders 30A and 30B, video decoder 33 may include an upsampling unit 92. In some embodiments, the upsampling unit 92 may upsample a BL of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame.

The upsampling unit 92 may be configured to receive a picture or frame (or picture information associated with the picture) from the decoded picture buffer 160 of the lower layer decoder (e.g., video decoder 30A) and to upsample the picture (or the received picture information). This upsampled picture may then be provided to the prediction processing unit 152 of a higher layer decoder (e.g., video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of video decoder 30A may be provided directly, or at least without being provided to the upsampling unit 92, to the prediction processing unit 152 of video decoder 30B. For example, if video data provided to video decoder 30B and the reference picture from the decoded picture buffer 160 of video decoder 30A are of the same size or resolution, the reference picture may be provided to video decoder 30B without upsampling. Further, in some embodiments, the upsampling unit 92 may be a resampling unit 90 configured to upsample or downsample a reference picture received from the decoded picture buffer 160 of video decoder 30A.

As illustrated in FIG. 3B, video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of video decoders 30A and 30B receives a portion of the bitstream at a given time. While in some cases the bits from the bitstream received at the demux 99 may be alternated one bit at a time between each of video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of video decoders 30A and 30B. For instance, two blocks may be provided to video decoder 30B for each block provided to video decoder 30A. In some embodiments, the division of the bitstream by the demux 99 may be preprogrammed. In other embodiments, the demux 99 may divide the bitstream based on a control signal received from a system external to video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by video decoder 33.

Presence of POC MSB

As discussed above, a multi-layer decoder may encounter problems when decoding a single-layer bitstream (e.g., a HEVC-encoded bitstream) that may lack information related to video coding extensions (e.g., VPS extensions, slice segment header extensions, etc. containing information related to a scalability extension of a single-layer standard). More specifically, the multi-layer decoder may incorrectly expect MSBs of a POC value to be signaled in the bitstream (e.g., the multi-layer decoder may incorrectly expect to receive the MSBs of the POC value), based on the absence of an indication (e.g., vps_poc_lsb_aligned_flag) in the bitstream that the access units in the bitstream have their POC LSBs aligned (e.g., all pictures in an access unit having the same POC LSBs). In some existing implementations, the semantics of vps_poc_lsb_aligned_flag may be provided as follows:

vps_poc_lsb_aligned_flag equal to 0 specifies that the value of slice_pic_order_cnt_lsb may or may not be the same in different pictures of an access unit. vps_poc_lsb_aligned_flag equal to 1 specifies that the value of slice_pic_order_cnt_lsb is the same in all pictures of an access unit. Additionally, the value of vps_poc_lsb_aligned_flag may affect the decoding process for picture order count in some existing implementations. When not present, vps_poc_lsb_aligned_flag is inferred to be equal to 0.

By inferring the value of vps_poc_lsb_aligned_flag, or values of other indications of POC LSB alignment, to be 0 when the flag is not present in the bitstream, the multi-layer decoder may make incorrect assumptions if the bitstream is an HEVC bitstream (e.g. having only one video layer). In HEVC bitstreams, the VPS extensions that would typically contain such an indication of POC LSB alignment may be absent. Thus, based on the absence of such an indication of POC LSB alignment, the decoder may infer that the POC LSBs are not aligned (e.g., pictures in the same access unit may have different POC LSBs), which may be incorrect. In some implementations, based on such an inference, the decoder determines whether POC MSB values need to be signaled in the bitstream. The decoder may make such a determination by first determining that POC LSBs are not aligned based on an inferred value of 0 of, for example, the vps_poc_lsb_aligned_flag, and then setting a parameter (e.g., PocMsbValRequiredFlag) designed to indicate whether POC MSB values are required to be signaled in the bitstream to a value of 1. In some embodiments, in addition to determining that POC LSBs are not aligned, the decoder further determines that the current picture being processed by the decoder is a clean random access (CRA) picture or a broken link access (BLA) picture before setting the PocMsbValRequiredFlag to a value of 1. Based on such a determination of whether POC MSB values are required to be signaled in the bitstream, the decoder determines whether the POC MSB values are in fact present (e.g., signaled by the encoder) in the bitstream. In some embodiments, the decoder processes a flag having the semantics provided as follows:

poc_msb_val_present_flag equal to 1 specifies that poc_msb_val is present. When poc_msb_val_present_flag is equal to 0 and PocMsbValRequiredFlag is equal to 0, poc_msb_val is not present. When not present, the value of poc_msb_val_present_flag is inferred as follows:
    If PocMsbValRequiredFlag is equal to 1, the value of poc_msb_val_present_flag is inferred to be equal to 1.
    Otherwise, the value of poc_msb_val_present_flag is inferred to be equal to 0.

Thus, as discussed above, when a multi-layer decoder processes a single-layer bitstream, the decoder may incorrectly infer that the single-layer bitstream contains non-aligned POC LSBs based on the absence of an indication in the bitstream that the POC LSBs are aligned, and the incorrect inferences causes the decoder to incorrectly determine that POC MSB values are required to be signaled in the bitstream. This incorrect determination causes the decoder to incorrectly infer that POC MSB values are actually present in the bitstream.

In some embodiments of the present disclosure, in order to avoid this chain of incorrect determinations, the decoder may infer that the POC LSBs are aligned whenever the indication of POC LSB alignment is not provided in the bitstream. However, such a solution may not completely address the problem, as the decoder may still infer that the POC MSB values are signaled in the bitstream by inferring the value of poc_msb_val_present_flag to be equal to 1, based on a determination that the value of PocMsbRequiredFlag is equal to 1. A coder may determine that the value of PocMsbRequiredFlag is equal to 1 when coding a CRA picture or a BLA picture.

In some embodiments of the present disclosure, the decoder may determine the value of poc_msb_val_present_flag based on the presence of slice segment header extensions in the bitstream. The decoder may also determine the value of poc_msb_val_present_flag based on the value of a flag that indicates the length of the slice segment header extension length. For example, the semantics of the poc_msb_val_present_flag could be altered such that a value of 1 for the syntax element specifies the presence of poc_msb_val only when the slice_segment_header_extension_length is not equal to zero, as shown below. Additions are shown in italics and deletions are shown in [[double brackets]].

poc_msb_val_present_flag equal to 1 specifies that poc_msb_val is present. When poc_msb_val_present_flag is equal to 0 [[and PocMsbValRequiredFlag is equal to 0]], poc_msb_val is not present. When not present, the value of poc_msb_val_present_flag is inferred as follows:
    If slice_segment_header_extension_length is equal to 0, the value of poc_msb_val_present_flag is inferred to be equal to 0.
    Otherwise, if PocMsbValRequiredFlag is equal to 1, the value of poc_msb_val_present_flag is inferred to be equal to 1.
    Otherwise, the value of poc_msb_val_present_flag is inferred to be equal to 0.

Figure 4:
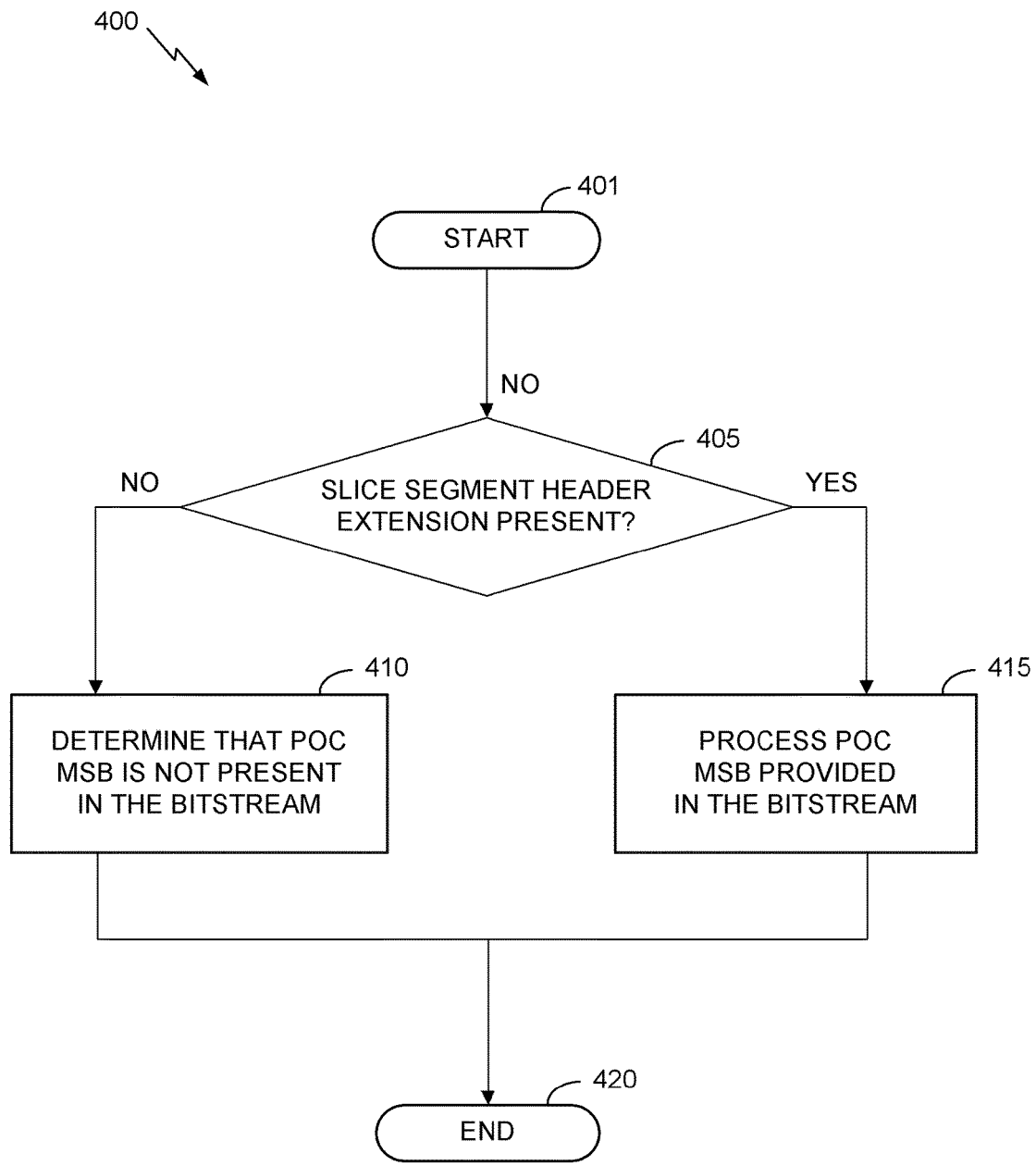
FIG. 4 is a flow chart illustrating a method of coding video information, according to one embodiment of the present disclosure.

FIG. 4 is a flowchart illustrating a method 400 for coding video information, according to an embodiment of the present disclosure. The steps illustrated in FIG. 4 may be performed by an encoder (e.g., the video encoder as shown in FIG. 2A or FIG. 2B), a decoder (e.g., the video decoder as shown in FIG. 3A or FIG. 3B), or any other component. For convenience, method 400 is described as performed by a coder, which may be the encoder, the decoder, or another component.

The method 400 begins at block 401. At block 405, the coder determines whether a slice segment header extension is present. The coder may determine whether a slice segment header extension (e.g., one that is associated with the current picture or current slice being processed by the coder) is present in the bitstream based on a flag provided in the bitstream that indicates a length of the slice segment header extension. The coder may also determine whether a slice segment header extension is present in the bitstream based on a flag provided in the bitstream that indicates whether the slice segment header extension is present in the bitstream. Such a flag may be provided in other portions of the bitstream, such as in the slice segment header, VPS, PPS, SPS, etc. If the coder determines that a slice segment header extension is not present in the bitstream, the method 400 proceeds to block 410. On the other hand, if the coder determines that a slice segment header extension is present in the bitstream, the method 400 proceeds to block 415.

At block 410, the coder determines that a POC MSB value (e.g., one that is associated with the current picture or current slice being processed by the coder) is not present in the bitstream. As a result of determining that the POC MSB value is not present in the bitstream, the coder may set a flag configured to indicate whether the POC MSB value is present in the bitstream to a value of 0. In some embodiments of the present disclosure, the coder may refrain from processing the POC MSB value in the bitstream that the coder is otherwise configured to process.

At block 415, the coder processes the POC MSB value in the bitstream. For example, the coder may be decoding a bitstream, and after determining that the slice segment header extension is present in the bitstream at block 405, the coder may process (or expect) the POC MSB value provided in the bitstream. The coder may further use the processed POC MSB value to calculate the POC value associated with the current picture being processed by the coder and/or to reset or align the POC values associated with pictures that are provided in the bitstream. The method 400 ends at 420.

As discussed above, one or more components of video encoder 20 of FIG. 2A, video encoder 23 of FIG. 2B, video decoder 30 of FIG. 3A, or video decoder 33 of FIG. 3B (e.g., inter-layer prediction unit 128 and/or inter-layer prediction unit 166) may be used to implement any of the techniques discussed in the present disclosure, such as determining whether the slice segment header extension is present in the bitstream, determining that the POC MSB value is not present in the bitstream, and processing the POC MSB provided in the bitstream.

In the method 400, one or more of the blocks shown in FIG. 4 may be removed (e.g., not performed), modified, and/or the order in which the method 400 is performed may be switched. For example, before making the determination at 405, the coder may first determine whether the POC LSBs are aligned (e.g., by checking a flag provided in the bitstream), and proceed to block 405 only after a determination that the POC LSBs are not aligned. In another embodiment, in addition to, or instead of, determining that the POC LSBs are aligned, the coder may determine that the current picture being processed by the coder is a CRA picture or a BLA picture before proceeding to block 405. For example, the coder may proceed to block 405 after determining that the POC LSBs are not aligned and that the current picture is a CRA picture or a BLA picture. In another embodiment, at block 405, the coder may determine that POC MSB values are required to be signaled (e.g., by setting the value of PocMsbValRequiredFlag to a value of 1) but, regardless of such a determination, proceed to block 410 based on a determination that the slice segment header extension is not present. In another embodiment, block 410 may be removed, and the method 400 may end without performing any additional operations if the coder determines that the slice segment header extension is not present. In yet another embodiment, block 415 may be removed, and the method 400 may end without performing any additional operations even if the coder determines that the slice segment header extension is present, if the coder determines that the POC MSB is not provided in the bitstream. Thus, the embodiments of the present disclosure are not limited to or by the example shown in FIG. 4, and other variations may be implemented without departing from the spirit of this disclosure.

Intra Random Access Point (IRAP) Pictures

Some video coding schemes may provide random access points throughout the bitstream such that the bitstream may be decoded starting from any of such random access point without needing to decode any pictures that precede such random access points. In such video coding schemes, all pictures that follow a random access point in output order (e.g., including those pictures that are in the same access unit as the picture providing the random access point) can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc.

In some coding schemes, such random access points may be provided by pictures that are referred to as intra random access point (IRAP) pictures. For example, a random access point (e.g., provided by an enhancement layer IRAP picture) in an enhancement layer ("layerA") contained in an access unit ("auA") may provide layer-specific random access such that for each reference layer ("layerB") of layerA (e.g., a reference layer being a layer that is used to predict layerA) having a random access point contained in an access unit ("auB") that is in layerB and precedes auA in decoding order (or a random access point contained in auA), the pictures in layerA that follow auB in output order (including those pictures located in auB), are correctly decodable without needing to decode any pictures in layerA that precede auB.

IRAP pictures may be coded using intra prediction (e.g., coded without referring to other pictures), and may include, for example, instantaneous decoder refresh (IDR) pictures, CRA pictures, and BLA pictures. When there is an IDR picture in the bitstream, all the pictures that precede the IDR picture in decoding order are not used for prediction by pictures that follow the IDR picture in decoding order. When there is a CRA picture in the bitstream, the pictures that follow the CRA picture may or may not use pictures that precede the CRA picture in decoding order for prediction. Pictures that follow the CRA picture in decoding order but use pictures that precede the CRA picture in decoding order may be referred to as random access skipped leading (RASL) pictures. Another type of picture that follows an IRAP picture in decoding order and precedes the IRAP picture in output order is a random access decodable leading (RADL) picture, which may not contain references to any pictures that precede the IRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., a picture having a layer ID value of 0) that is an IRAP picture may be referred to as an IRAP access unit.

Cross-Layer Alignment of IRAP Pictures

In some existing coding schemes, IRAP pictures may not be required to be aligned (e.g., contained in the same access unit) across different layers. For example, if IRAP pictures were required to be aligned, any access unit containing at least one IRAP picture would only contain IRAP pictures. On the other hand, if IRAP pictures were not required to be aligned, in a single access unit, one picture (e.g., in a first layer) may be an IRAP picture, and another picture (e.g., in a second layer) may be a non-IRAP picture. Having such non-aligned IRAP pictures in a bitstream may provide some advantages. For example, in a two-layer bitstream, if there are more IRAP pictures in the base layer than in the enhancement layer, in broadcast and multicast applications, low tune-in delay and high coding efficiency can be achieved.

In some video coding schemes, a POC may be used to keep track of the relative order in which the decoded pictures are displayed. Some of such coding schemes may cause the POC values to be reset (e.g., set to zero or set to some value signaled in the bitstream) whenever certain types of pictures are processed in the bitstream. Such pictures may be referred to as POC resetting pictures. For example, the POC values of certain IRAP pictures may be reset, causing the POC values of other pictures preceding those IRAP pictures in decoding order to also be reset. This may be problematic when the IRAP pictures are not required to be aligned across different layers. For example, when one picture ("picA") is an IRAP picture and another picture ("picB") in the same access unit is not an IRAP picture, the POC value of a picture ("picC"), which is reset due to picA being an IRAP picture, in the layer containing picA may be different from the POC value of a picture ("picD"), which is not reset, in the layer containing picB, where picC and picD are in the same access unit. This causes picC and picD to have different POC values even though they belong to the same access unit (e.g., same output time). Thus, in this example, the derivation process for deriving the POC values of picC and picD can be modified to produce POC values that are consistent with the definition of POC values and access units.

Long Term Reference Pictures Across POC Resetting Periods

When a CRA picture of a particular EL and/or a RASL picture associated with such a CRA picture utilize long term reference pictures (LTRPs) for prediction and there exist one or more POC resetting pictures in the same layer that follow, in decoding order, the LTRPs and precede, in decoding order, the CRA picture, certain bitstreams that are obtained by removing the one or more POC resetting pictures that precede the CRA picture in decoding order could cause the CRA picture and/or the RASL picture to reference the wrong pictures for prediction or cause some of those reference pictures to be unavailable for prediction.

Figure 5:
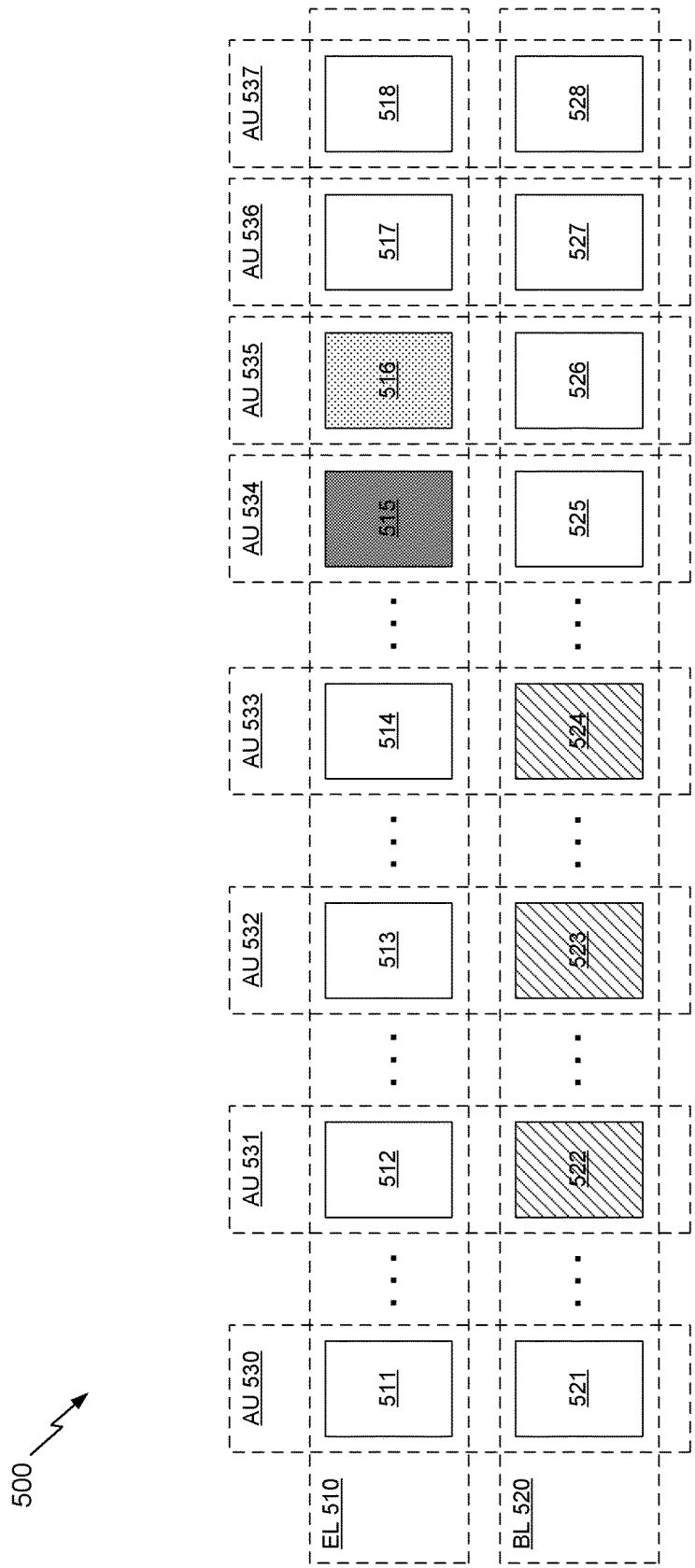
FIG. 5 is a block diagram illustrating an example configuration of pictures in different layers.

FIG. 5 shows a multi-layer bitstream 500 including an EL 510 and a BL 520. The EL 510 includes EL pictures 511-518, and the BL includes BL pictures 521-528. The multi-layer bitstream 500 further includes access units (AUs) 530-537. As shown in FIG. 5, the AU 530 includes the EL picture 511 and the BL picture 521, the AU 531 includes the EL picture 512 and the BL picture 522, the AU 532 includes the EL picture 513 and the BL picture 523, the AU 533 includes the EL picture 514 and the BL picture 524, the AU 534 includes the EL picture 515 and the BL picture 525, the AU 535 includes the EL picture 516 and the BL picture 526, the AU 536 includes the EL picture 517 and the BL picture 527, and the AU 537 includes the EL picture 518 and the BL picture 528. In the example of FIG. 5, the BL pictures 522-524 are IDR pictures, the EL picture 515 is a CRA picture, and the EL picture 516 is a RASL picture associated with the CRA picture 515. The EL picture 511 is an LTRP of the RASL picture 516 (e.g., the RASL picture 516 is coded based on the LTRP 511). The EL pictures 512-514 are POC resetting pictures. Thus, the bitstream 500 contains IRAP pictures (e.g., IDR pictures 522-524) that are not cross-layer aligned.

Figure 6:
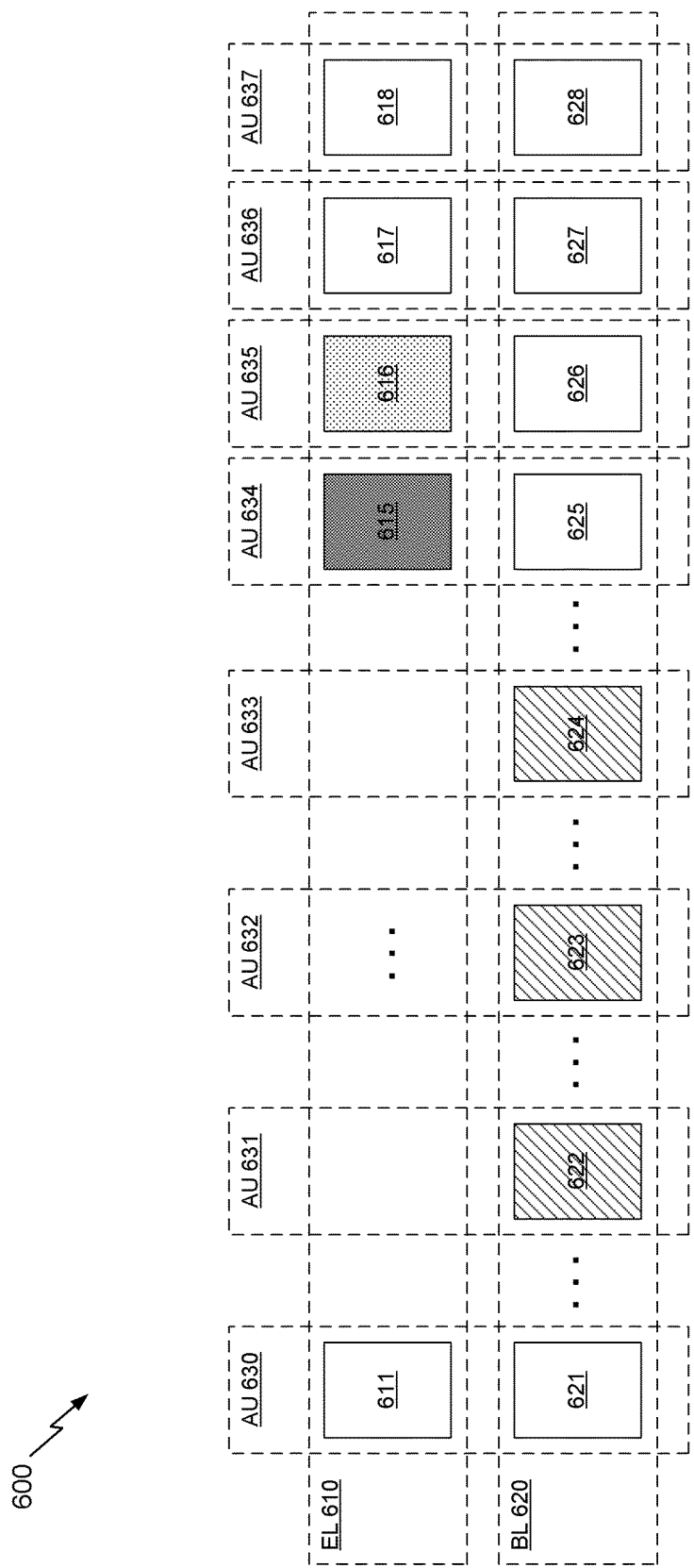
FIG. 6 is a block diagram illustrating another example configuration of pictures in different layers.

In the example of FIG. 5, if the LTRP 511 is the only reference picture that the RASL picture 516 uses, the reference picture set (RPS) subset RefPicSetLtFoll of the CRA picture 515 (e.g., a set of LTRPs that are used for reference by pictures that follow the CRA picture 515 in decoding order) may include the LTRP 511 because the RASL picture 516 uses the LTRP 511 for reference. Similarly, POC resetting pictures 512-514 may also have the LTRP 511 in their respective RPS. In some embodiments of the present disclosure, a middle-box may subject the bitstream to a down-switch followed by an up-switch (e.g., to satisfy certain bandwidth conditions or to adapt to a lower available bandwidth). In such embodiments, the middle-box may produce a bitstream 600 that is illustrated in FIG. 6. The multi-layer bitstream 600 of FIG. 6 includes an EL 610 and a BL 620. The EL 610 includes EL pictures 611 and 615-618, and the BL includes BL pictures 621-628. The multi-layer bitstream 600 further includes AUs 630-637. As shown in FIG. 6, the AU 630 includes the EL picture 611 and the BL picture 621, the AU 631 includes the BL picture 622, the AU 632 includes the BL picture 623, the AU 633 includes the BL picture 624, the AU 634 includes the EL picture 615 and the BL picture 625, the AU 635 includes the EL picture 616 and the BL picture 626, the AU 636 includes the EL picture 617 and the BL picture 627, and the AU 637 includes the EL picture 618 and the BL picture 628. In the example of FIG. 6, the BL pictures 622-624 are IDR pictures, the EL picture 615 is a CRA picture, and the EL picture 616 is a RASL picture associated with the CRA picture 615. The EL picture 611 is an LTRP of the RASL picture 616 (e.g., the RASL picture 616 is coded based on the LTRP 611). As illustrated in FIG. 6, the EL pictures corresponding to the POC resetting pictures 512-514 of FIG. 5 have been removed from the bitstream 600.

In the example of FIG. 6, the LTRP 611 may be available in the sub-decoded picture buffer (DPB) corresponding to the EL 610. However, as a result of the down-switch and up-switch, the POC of the LTRP 611, which would have been decremented (but for the down-switch and up-switch) by the POC resets performed in association with POC resetting pictures that follow the LTRP 611 but precede the CRA picture 615 in decoding order, is not decremented. The amount by which the POCs of the pictures preceding such POC resetting pictures (including the LTRP 611) are to be decremented is lost (or is not determinable by the decoder processing the bitstream 600) because the POC resetting pictures were removed during the down-switch and up-switch. For example, if the POC LSB length used for the bitstream 600 is 8 bits, and the RPS associated with the CRA picture 615 refers to the LTRP 611 using the POC LSB of the LTRP 611 (e.g., 100) in the original bitstream 500, the POC LSB used by the RPS of the CRA picture 615 to refer to the LTRP 611 is no longer valid after the down-switch and up-switch. If the NAL unit type of the CRA picture 615 is not changed to one of the NAL unit types of a BLA picture, or the HandleCraAsBlaFlag corresponding to the CRA picture 615 is not set to a value of 1, the resulting bitstream 600 would be considered a non-conformant bitstream. In the example, when the RASL picture 616 only uses the LTRP 611 for reference, there is no need to mark the CRA picture 615 as a BLA picture or change the value of its flag HandleCraAsBlaFlag to a value of 1 because the RASL picture 616 is correctly decodable.

In some embodiments of the present disclosure, if the RASL picture 616 referred to a short term reference picture (STRP) instead of the LTRP 611, and the STRP is removed from the bitstream, the middle-box removing the STRP may be mandated to change the NAL unit type of the CRA picture associated with the RASL picture 616 (e.g., the CRA picture 615 in the example of FIG. 6) or set the value of HandleCraAsBlaFlag corresponding to such a CRA picture equal to 1 such that the CRA picture may be handled as a BLA picture.

In some embodiments of the present disclosure, a bitstream conformance constraint may specify that RASL pictures cannot use LTRPs that precede a POC resetting picture in the same layer that precedes the associated IRAP picture of the RASL pictures in decoding order. In such embodiments, the coder may determine such a bitstream constraint to be applicable and adhere to the bitstream constraint such that the coded bitstream conforms to the bitstream constraint. In the example of FIG. 5, the RASL picture 516 would not be able to use the LTRP 511 for reference. In some embodiments of the present disclosure, the bitstream conformance constraint may specify that a CRA picture cannot include in its RPS any LTRP that precedes, in decoding order, any POC resetting picture that is in the same layer as the CRA and that precedes, in decoding order, the CRA picture. In some embodiments of the present disclosure, the bitstream conformance constraint may specify that a CRA picture cannot include in its RPS any picture that precedes, in decoding order, any POC resetting picture that is in the same layer as the CRA and that precedes, in decoding order, the CRA picture. In some embodiments of the present disclosure, the bitstream conformance constraints described herein may be applied to layers that have nuh_layer_id greater than 0 (e.g., layers other than the base layer).

For example, the bitstream conformance constraint may be implemented by including the following constraint on the RPS: "it is a requirement of bitstream conformance that any picture in RefPicSetLtFoll, when present, of a CRA picture shall not precede the POC resetting picture that precedes, in decoding order, the CRA picture and that has the same nuh_layer_id as the CRA picture." Alternatively, the following constraint may be used: "it is a requirement of bitstream conformance that any picture in the RPS of a CRA picture that has nuh_layer_id greater than 0 shall not precede, in decoding order, any POC resetting picture that precedes, in decoding order, the CRA picture and that has the same nuh_layer_id as the CRA picture."

No Picture in a POC Resetting Period

If a bitstream does not contain any picture at a particular layer for an entire POC resetting period (e.g., a period that begins with a POC reset and ends immediately prior to the next POC reset), the encoder may not be able to generate a conformant bitstream in some use cases. For example, the POC values associated with pictures in each layer is decremented based on the information available in the first picture (e.g., POC resetting picture) belonging to that layer and contained in a POC resetting period. When a particular layer does not contain any picture in a given POC resetting period, the amount by which the POC values associated with pictures in the particular layer should be decremented may not be available or determinable. This problem is illustrated in FIG. 7.

Figure 7:
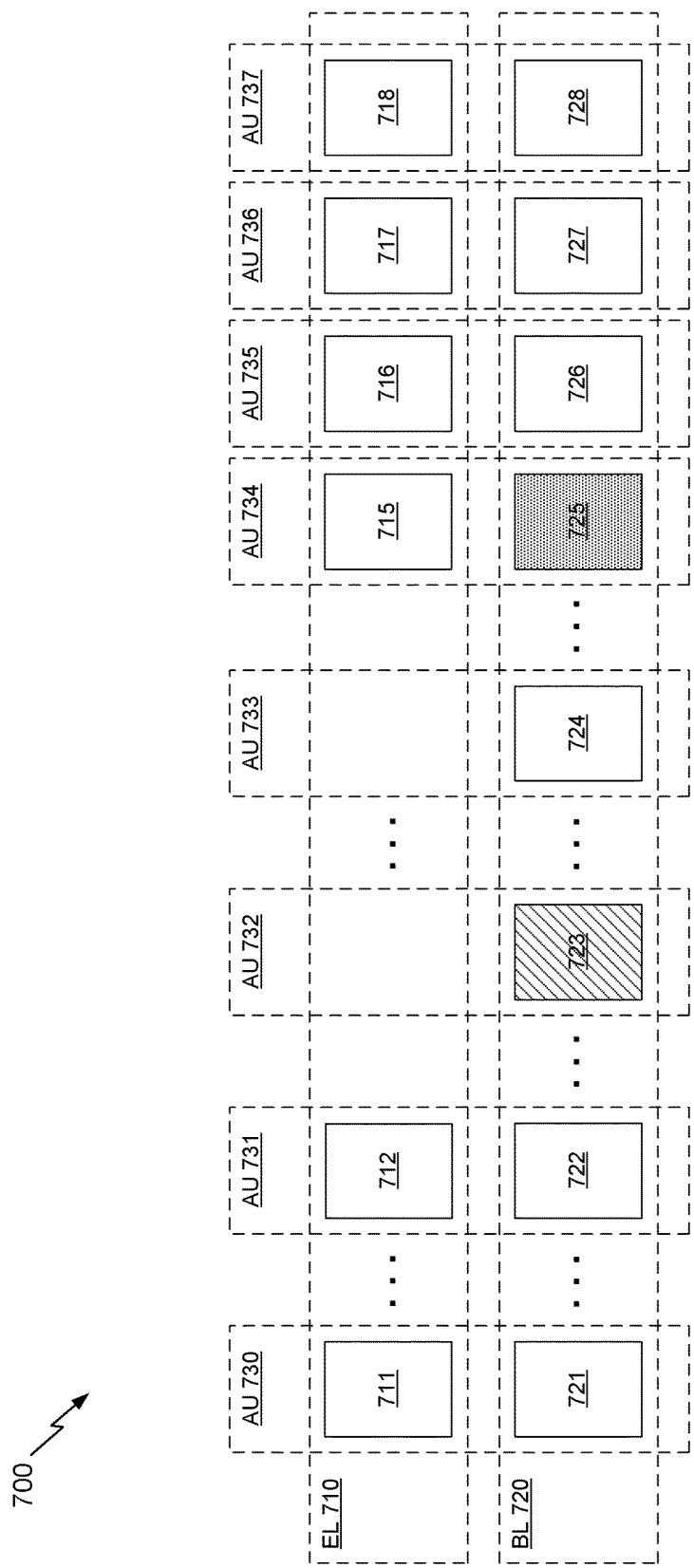
FIG. 7 is a block diagram illustrating yet another example configuration of pictures in different layers.

FIG. 7 shows a multi-layer bitstream 700 including an EL 710 and a BL 720. The EL 710 includes EL pictures 711, 712, and 715-718, and the BL includes BL pictures 721-728. The multi-layer bitstream 700 further includes Ails 730-737. As shown in FIG. 7, the AU 730 includes the EL picture 711 and the BL picture 721, the AU 731 includes the EL picture 712 and the BL picture 722, the AU 732 includes the BL picture 723, the AU 733 includes the BL picture 724, the AU 734 includes the EL picture 715 and the BL picture 725, the AU 735 includes the EL picture 716 and the BL picture 726, the AU 736 includes the EL picture 717 and the BL picture 727, and the AU 737 includes the EL picture 718 and the BL picture 728. In the example of FIG. 7, the BL picture 723 is an IDR picture and the BL picture 725 is a CRA picture. The IDR picture 723, the CRA picture 725, and the EL picture 715 are POC resetting pictures having poc_reset_idc values equal to 1 or 2 (e.g., indicating a full POC reset or an POC MSB reset).

As illustrated in FIG. 7, the bitstream 700 does not contain any EL pictures from the AU 732 to the AU 733. Thus, when the coder performs the POC reset associated with the IDR picture 723 (e.g., a full POC reset of the pictures in the AU 732), the coder may not know the amount by which the EL pictures preceding the AU 732 should be decremented. If poc_reset_idc associated with the EL picture 715 indicates that a POC MSB reset is to be performed at the AU 734, the coder may not be aware of the POC decrement of EL pictures that was not, but should have been, performed at the AU 732.

In some embodiments of the present disclosure, the POC decrement information is additionally signaled in the slice segment header extension, and this additional information may be used to derive the value by which the POC values of previously decoded pictures that are in the same layer as the current picture are to be decremented. In other embodiments, the additional POC decrement information may be sent only when the picture is a POC resetting picture that is associated with a POC MSB reset (e.g., not a full reset). These features may be implemented as shown below.

Changes to Slice Segment Header Syntax

An encoder may be able to encode a bitstream illustrated in FIG. 7 if the functionality associated with poc_reset_idc equal to a value of 3 is removed and provided as a separate flag. This change may allow the functionality associated with poc_reset_idc equal to a value of 3 may be used for those pictures that were associated with poc_reset_idc values of 1 or 2 before this change. The changes to the syntax, semantics, and decoding process are highlighted below: additions are shown in italics and deletions are shown in [[double brackets]]. Table 1 illustrates the changes to the slice_segment_header( ) syntax:

TABLE 1

Example Syntax of slice_segment_header( )

| | Descriptor |
|---|---|
| slice_segment_header( ) { | |
|   first_slice_segment_in_pic_flag | u(1) |
|   ... | |
|   if( slice_segment_header_extension_present_flag ) { | |
|     slice_segment_header_extension_length | ue(v) |
|     if( poc_reset_info_present_flag ) { | |
|       poc_reset_idc | u(2) |
|       *poc_decrement_info_present_flag* | *u(1)* |
|     } | |
|     if( poc_reset_idc != 0 ) | |
|       poc_reset_period_id | u(6) |
|     if( [[poc_reset_idc == 3]] | |
|     *poc_decrement_info_present_flag* ) { | |
|       full_poc_reset_flag | u(1) |
|       poc_lsb_val | u(v) |
|     } | |
|     if( !PocMsbValRequiredFlag && | |
|     vps_poc_lsb_aligned_flag ) | |
|       poc_msb_val_present_flag | u(1) |
|     if( poc_msb_val_present_flag ) | |
|       poc_msb_val | ue(v) |
|     while( | |
|     more_data_in_slice_segment_header_extension( | |
|     ) ) | |
|       slice_segment_header_extension_data_bit | u(1) |
|   } | |
|   byte_alignment( ) | |
| } | |

Changes to Slice Segment Header Semantics

The slice segment header semantics may be modified as shown below, where additions are shown in italics and deletions are shown in [[double brackets]]:

poc_reset_idc equal to 0 specifies that neither the most significant bits nor the least significant bits of the picture order count value for the current picture are reset. poc_reset_idc equal to 1 specifies that only the most significant bits of the picture order count value for the current picture may be reset. poc_reset_idc equal to 2 specifies that both the most significant bits and the least significant bits of the picture order count value for the current picture may be reset. [[poc_reset_idc equal to 3 specifies that either only the most significant bits or both the most significant bits and the least significant bits of the picture order count value for the current picture may be reset and additional picture order count information is signalled.]] When not present, the value of poc_reset_idc is inferred to be equal to 0.

It is a requirement of bitstream conformance that the following constraints apply:

The value of poc_reset_idc shall not be equal to 1 or 2 for a RASL picture, a RADL picture, a sub-layer non-reference picture, or a picture that has TemporalId greater than 0, or a picture that has discardable_flag equal to 1.

The value of poc_reset_idc of all pictures in an access unit shall be the same.

When the picture in an access unit with nuh_layer_id equal to 0 is an IRAP picture with a particular value of nal_unit_type and there is at least one other picture in the same access unit with a different value of nal_unit_type, the value of poc_reset_idc shall be equal to 1 or 2 for all pictures in the access unit.

When there is at least one picture that has nuh_layer_id greater than 0 and that is an IDR picture with a particular value of nal_unit_type in an access unit and there is at least one other picture in the same access unit with a different value of nal_unit_type, the value of poc_reset_idc shall be equal to 1 or 2 for all pictures in the access unit.

The value of poc_reset_idc of a CRA or BLA picture shall less than 3.

When the picture with nuh_layer_id equal to 0 in an access unit is an IDR picture and there is at least one non-IDR picture in the same access unit, the value of poc_reset_idc shall be equal to 2 for all pictures in the access unit.

When the picture with nuh_layer_id equal to 0 in an access unit is not an IDR picture, the value of poc_reset_idc shall not be equal to 2 for any picture in the access unit.

The value of poc_reset_idc of an access unit is the value of poc_reset_idc of the pictures in the access unit.

poc_reset_period_id identifies a POC resetting period. There shall be no two pictures consecutive in decoding order in the same layer that have the same value of poc_reset_period_id and poc_reset_idc equal to 1 or 2. When not present, the value of poc_reset_period_id is inferred as follows:

If the previous picture picA that has poc_reset_period_id present in the slice segment header in present in the same layer of the bitstream as the current picture, the value of poc_reset_period_id is inferred to be equal to the value of the poc_reset_period_id of picA.

Otherwise, the value of poc_reset_period_id is inferred to be equal to 0.

NOTE—It is not prohibited for multiple pictures in a layer to have the same value of poc_reset_period_id and to have poc_reset_idc equal to 1 or 2 unless such pictures occur in two consecutive access units in decoding order. To minimize the likelihood of such two pictures appearing in the bitstream due to picture losses, bitstream extraction, seeking, or splicing operations, encoders should set the value of poc_reset_period_id to be a random value for each POC resetting period (subject to the constraints specified above). It is a requirement of bitstream conformance that the following constraints apply:

One POC resetting period shall not include more than one access unit with poc_reset_idc equal to 1 or 2.

An access unit with poc_reset_idc equal to 1 or 2 shall be the first access unit in a POC resetting period.

A picture that follows, in decoding order, the first POC resetting picture among all layers of a POC resetting period in decoding order shall not precede, in output order, another picture in any layer that precedes the first POC resetting picture in decoding order.

poc_decrement_info_present_flag equal to 1 specifies that the syntax elements full_poc_reset_flag and poc_lsb_val are signalled in the slice header extension. poc_decrement_info_present_flag equal to 0 specifies that the syntax elements full_poc_reset_flag and poc_lsb_val are not signalled in the slice header extension.

full_poc_reset_flag equal to 1 specifies that both the most significant bits and the least significant bits of the picture order count value for the current picture are reset when the previous picture in decoding order in the same layer does not belong to the same POC resetting period. full_poc_reset_flag equal to 0 specifies that only the most significant bits of the picture order count value for the current picture are reset when the previous picture in decoding order in the same layer does not belong to the same POC resetting period.

poc_lsb_val specifies a value that may be used to derive the picture order count of the current picture. The length of the poc_lsb_val syntax element is log 2_max_pic_order_cnt_lsb_minus4+4 bits.

It is a requirement of bitstream conformance that, when poc_decrement_info_present_flag is equal to 1 [[poc_reset_idc is equal to 3]], and the previous picture picA in decoding order that is in the same layer as the current picture, that has poc_reset_idc equal to 1 or 2, and that belongs to the same POC resetting period is present in the bitstream, picA shall be the same picture as the previous picture in decoding order that is in the same layer as the current picture, that is not a RASL picture, a RADL picture or a sub-layer non-reference picture, and that has TemporalId equal to 0 and discardable_flag equal to 0, and the value of poc_lsb_val of the current picture shall be equal to the value of slice_pic_order_cnt_lsb of picA.

The variable PocMsbValRequiredFlag is derived as follows:

```
PocMsbValRequiredFlag = CraOrBlaPicFlag && (
    !vps_poc_lsb_aligned_flag ||
        ( vps_poc_lsb_aligned_flag && NumDirectRefLayers[
        nuh_layer_id ] = = 0 )
)
```

Alternatively, the following constraint is added as a bitstream conformance constraint.

It is a requirement of bitstream conformance that the following constraint applies:

When poc_decrement_info_present_flag is equal to 1, poc_reset_idc shall not be equal to 0 or 2.

Alternatively, the following constraint is added as a bitstream conformance constraint.

It is a requirement of bitstream conformance that the following constraint applies:

When poc_decrement_info_present_flag is equal to 1, poc_reset_idc shall not be equal to 2.

Changes to Decoding Process of POC

The existing decoding process described in the HEVC specification may be modified as shown below, where additions are shown in italics and deletions are shown in [[double brackets]]:

F.8.3.1 Decoding process for picture order count

Output of this process is PicOrderCntVal, the picture order count of the current picture. Picture order counts are used to identify pictures, for deriving motion parameters in merge mode and motion vector prediction, and for decoder conformance checking (see subclause C.5).

Each coded picture is associated with a picture order count variable, denoted as PicOrderCntVal.

When the current picture is the first picture among all layers of a POC resetting period, the variable PocDecrementedInDPBFlag[i] is set equal to 0 for each value of i in the range of 0 to 62, inclusive.

The variable pocResettingFlag is derived as follows:

If the current picture is a POC resetting picture, the following applies:

If vps_poc_lsb_aligned_flag is equal to 0, pocResettingFlag is set equal to 1.

Otherwise, if PocDecrementedInDPBFlag[nuh_layer_id] is equal to 1, pocResettingFlag is set equal to 0.

Otherwise, pocResettingFlag is set equal to 1.

Otherwise, pocResettingFlag is set equal to 0.

The list affectedLayerList is derived as follows:

If vps_poc_lsb_aligned_flag is equal to 0, affectedLayerList consists of the nuh_layer_id of the current picture.

Otherwise, affectedLayerList consists of the nuh_layer_id of the current picture and the nuh_layer_id values equal to PredictedLayerId[currNuhLayerId][j] for all values of j in the range of 0 to NumPredictedLayers[currNuhLayerId]−1, inclusive, where currNuhLayerId is the nuh_layer_id value of the current picture.

If pocResettingFlag is equal to 1, the following applies:
When FirstPicInLayerDecodedFlag[nuh_layer_id] is equal to 1, the following applies:
The variables pocMsbDelta, pocLsbDelta and DeltaPocVal are derived as follows:

```
if( [[poc_reset_idc = = 3]]poc_decrement_info_present_flag )
    pocLsbVal = poc_lsb_val
else
    pocLsbVal = slice_pic_order_cnt_lsb
if( poc_msb_val_present_flag )
    pocMsbDelta = poc_msb_val * MaxPicOrderCntLsb
else {
    prevPicOrderCntLsb =
PrevPicOrderCnt[ nuh_layer_id ] & ( MaxPicOrderCntLsb − 1 )
    prevPicOrderCntMsb = PrevPicOrderCnt[ nuh_layer_id ] − prevPicOrderCntLsb
    pocMsbDelta = getCurrMsb( pocLsbVal, prevPicOrderCntLsb, prevPicOrderCntMsb,
                MaxPicOrderCntLsb )
}
if( poc_reset_idc = = 2 || ( [[poc_reset_idc = = 3]]
poc_decrement_info_present_flag && full_poc_reset_flag ) )
    pocLsbDelta = pocLsbVal
else
    pocLsbDelta = 0
DeltaPocVal = pocMsbDelta + pocLsbDelta
```

The PicOrderCntVal of each picture that is in the DPB and has nuh_layer_id value nuhLayerId for which PocDecrementedInDPBFlag[nuhLayerId] is equal to 0 and that is equal to any value in affectedLayerList is decremented by DeltaPocVal.

PocDecrementedInDPBFlag[nuhLayerId] is set equal to 1 for each value of nuhLayerId included in affectedLayerList.

The PicOrderCntVal of the current picture is derived as follows:

```
if( poc_reset_idc = = 1 )
    PicOrderCntVal = slice_pic_order_cnt_lsb
else if( poc_reset_idc = = 2 )
    PicOrderCntVal = 0
else if( poc_decrement_info_present_flag = = 1 ){ [[//
poc_reset_idc = = 3]]
    PicOrderCntMsb = getCurrMsb( slice_pic_order_cnt_lsb,
    full_poc_reset_flag ? 0 : poc_lsb_val,
            0, MaxPicOrderCntLsb )
    PicOrderCntVal = PicOrderCntMsb + slice_pic_order_cnt_lsb
}
```

Otherwise, the following applies:
The PicOrderCntVal of the current picture is derived as follows:

```
if( poc_msb_val_present_flag )
    PicOrderCntMsb = poc_msb_val * MaxPicOrderCntLsb
else if(!FirstPicInLayerDecodedFlag[ nuh_layer_id ] ||
        nal_unit_type = = IDR_N_LP || nal_unit_type = =
        IDR_W_RADL )
    PicOrderCntMsb = 0
else {
    prevPicOrderCntLsb = PrevPicOrderCnt[ nuh_layer_id ] & (
MaxPicOrderCntLsb − 1 ).
    prevPicOrderCntMsb = PrevPicOrderCnt[ nuh_layer_id ] −
prevPicOrderCntLsb
    PicOrderCntMsb = getCurrMsb( slice_pic_order_cnt_lsb,
prevPicOrderCntLsb, prevPicOrderCntMsb, MaxPicOrderCntLsb )
}
PicOrderCntVal = PicOrderCntMsb + slice_pic_order_cnt_lsb
```

The value of PrevPicOrderCnt[lId] for each of the lId values included in affectedLayerList is derived as follows:

If the current picture is not a RASL picture, a RADL picture or a sub-layer non-reference picture, and the current picture has TemporalId equal to 0 and discardable_flag equal to 0, PrevPicOrderCnt[lId] is set equal to PicOrderCntVal.

Otherwise, when poc_decrement_info_present_flag is equal to 1 [[poc_reset_idc is equal to 3]] and one of the following conditions is true, PrevPicOrderCnt[lId] is set equal to (full_poc_reset_flag? 0: poc_lsb_val):

FirstPicInLayerDecodedFlag[nuh_layer_id] is equal to 0.

FirstPicInLayerDecodedFlag[nuh_layer_id] is equal to 1 and the current picture is a POC resetting picture.

The value of PicOrderCntVal shall be in the range of $-2^{31}$ to $2^{31}-1$, inclusive. In one CVS, the PicOrderCntVal values for any two coded pictures in the same layer shall not be the same. The function PicOrderCnt(picX) is specified as follows:

PicOrder*Cnt*(pic*X*)=PicOrder*CntVal* of the picture pic*X*

The function DiffPicOrderCnt(picA, picB) is specified as follows:

*Diff*PicOrder*Cnt*(*picA*,*picB*)=PicOrder*Cnt*(*picA*)−PicOrder*Cnt*(*picB*)

The bitstream shall not contain data that result in values of DiffPicOrderCnt(picA, picB) used in the decoding process that are not in the range of $-2^{15}$ to $2^{15}-1$, inclusive.

NOTE—Let X be the current picture and Y and Z be two other pictures in the same sequence, Y and Z are considered to be in the same output order direction from X when both DiffPicOrderCnt(X, Y) and DiffPicOrderCnt(X, Z) are positive or both are negative.

Alternatively, a CRA could be allowed to have poc_reset_idc equal to 3 and the semantics of poc_msb_val is modified such that the value of poc_msb_val shall be equal to the difference between the values of the most significant bits of the picture order counts of the current picture and the previous POC resetting picture [[in the same layer]] or the previous IDR picture [[in the same layer]], whichever is closer, in decoding order, to the current picture.

Semantics of Slice Segment Header Extension Syntax Elements

Currently the semantics of syntax elements slice_segment_header_extension_length and slice_segment_header_extension_data_bit are not defined. The following semantics may be added to the HEVC specification.

slice_segment_header_extension_length specifies the length of the slice header extension data following this syntax element, in bytes. The value of slice_segment_header_extension_length shall be in the range of 0 to 4096, inclusive.

When not present, the value of slice_segment_header_extension_length is inferred to be equal to 0.
slice_segment_header_extension_data_bit may have any value. Decoders shall ignore the value of slice_segment_header_extension_data_bit. Its value does not affect decoder conformance to profiles specified in this version of this Specification.
Semantics of Poc Reset Info Present Flag The syntax element poc_reset_info_present_flag is signalled in the PPS, conditioned on the value of the flag pps_extension_type_flag[0]. The syntax and semantics of the poc_reset_info_present_flag are reproduced below. Table 2 illustrates an example syntax of pic_parameter_set_rbsp( ).

TABLE 2

Example Syntax of pic_parameter_set_rbsp( )

| | Descriptor |
|---|---|
| pic_parameter_set_rbsp( ) { | |
|     pps_pic_parameter_set_id | ue(v) |
|     ... | u(1) |
|     pps_extension_flag | u(1) |
|     if( pps_extension_flag ) { | |
|         for ( i = 0; i < 8; i++ ) | |
|             pps_extension_type_flag[ i ] | u(1) |
|         if( pps_extension_type_flag[ 0 ] ) | |
|             poc_reset_info_present_flag | u(1) |
|         if( pps_extension_type_flag[ 7 ] ) | |
|             while( more_rbsp_data( ) ) | |
|                 pps_extension_data_flag | u(1) |
|     } | |
|     rbsp_trailing_bits( ) | |
| } | | pps_extension_type_flag[i] shall be equal to 0, for i in the range of 1 to 6, inclusive, in bitstreams conforming to this version of this Specification. pps_extension_type_flag[0] equal to 1 specifies that poc_reset_info_present_flag is present in the PPS RBSP syntax structure. pps_extension_type_flag[0] equal to 0 specifies that poc_reset_info_present_flag is not present in the PPS RBSP syntax structure. The value of 1 for pps_extension_type_flag[i], for i in the range of 1 to 7, inclusive, is reserved for future use by ITU-T|ISO/IEC. pps_extension_type_flag[7] equal to 0 specifies that no pps_extension_data_flag syntax elements are present in the PPS RBSP syntax structure. Decoders shall ignore all pps_extension_data_flag syntax elements that follow the value 1 for pps_extension_type_flag[7] in an PPS NAL unit. poc_reset_info_present_flag equal to 0 specifies that the syntax element poc_reset_idc is not present in the slice segment headers of the slices referring to the PPS. poc_reset_info_present_flag equal to 1 specifies that the syntax element poc_reset_idc is present in the slice segment headers of the slices referring to the PPS.

In some implementations, even when the value of poc_reset_info_present_flag is equal to 0, the current syntax may mandate that pps_extension_type_flag[0] be set to a value of 1 and poc_reset_info_present_flag be signaled. However, it may be more efficient not to signal poc_reset_info_present_flag and instead infer its value to be equal to 0 when the syntax element is not present. Such a change may be implemented by modifying the semantics as shown below, where the added language is shown in italics:
poc_reset_info_present_flag equal to 0 specifies that the syntax element poc_reset_idc is not present in the slice segment headers of the slices referring to the PPS. poc_reset_info_present_flag equal to 1 specifies that the syntax element poc_reset_idc is present in the slice segment headers of the slices referring to the PPS. *When not present, the value of poc_reset_info_present_flag is inferred to be equal to 0.*

The techniques described in the present disclosure may be applied independently and some or all of them may be applied in combination. The indications, flags, and/or syntax elements described herein may be provided in various portions of the bitstream including, but not limited to, VPS, SPS, PPS, slice headers, SEI messages, etc. and may even be specified by external means.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, ASICs, FPGAs, or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus for decoding video information in a bitstream, comprising:
a memory configured to store video data associated with a video layer having a current picture; and
a processor in communication with the memory and configured to:
determine whether a length of a slice segment header extension associated with the current picture is zero;
based on a determination that the length of the slice segment header extension associated with the current picture is zero, determine that a first syntax element indicative of one or more most significant bits (MSBs) of a picture order count (POC) value associated with the current picture is not present in the bitstream; and
based on the determination that the first syntax element is not present in the bitstream, decode the current picture without receiving, in the bitstream, the first syntax element indicative of the one or more MSBs of the POC value associated with the current picture.

2. The apparatus of claim 1, wherein the processor is further configured to determine whether the length of the slice segment header extension is zero based on a second syntax element indicative of the length of the slice segment header extension.

3. The apparatus of claim 1, wherein the processor is further configured to determine whether the length of the slice segment header extension is zero based on a third syntax element indicative of whether the slice segment header extension associated with the current picture is present in the bitstream.

4. The apparatus of claim 1, wherein the processor is further configured to determine that the first syntax element is not present in the bitstream based at least in part on whether the current picture is a clean random access (CRA) picture or a broken link access (BLA) picture.

5. The apparatus of claim 1, wherein the processor is further configured to:
determine whether the current picture is a CRA picture or a BLA picture;
process an indication that the one or more MSBs of the POC value are required to be provided in the bitstream based on a determination that the current picture is a CRA picture or a BLA picture; and
regardless of the indication that the one or more MSBs of the POC value are required to be present in the bitstream, determine that the first syntax element is not present in the bitstream based on the determination that the length of the slice segment header extension is zero.

6. The apparatus of claim 5, wherein the processor is further configured to determine whether the length of the slice segment header extension is zero based on a second syntax element indicative of the length of the slice segment header extension.

7. The apparatus of claim 1, wherein the processor is further configured to set a parameter to zero to indicate that the first syntax element is not present in the bitstream.

8. The apparatus of claim 1, wherein the processor is further configured to decode the video layer based at least in part on a second syntax elements indicative of one or more MSBs of a POC value associated with another picture based on a determination that a length of another slice segment header extension associated with said another picture is not zero.

9. The apparatus of claim 8, wherein the second syntax element is provided in said another slice segment header extension.

10. The apparatus of claim 8, wherein the processor is further configured to:
determine whether the one or more MSBs of the POC value associated with said another picture are required to be present in the bitstream based on a determination that said another slice segment header extension is present in the bitstream; and
process the second syntax element in the bitstream based on a determination that the one or more MSBs of the POC value associated with said another picture are required to be present in the bitstream.

11. The apparatus of claim 1, wherein the processor is further configured to determine that the first syntax element is not present in the bitstream based on a determination that the one or more MSBs of the POC value associated are not required to be present in the bitstream.

12. A method of decoding video information in a bitstream, the method comprising:
determining whether a length of a slice segment header extension associated with a current picture in a video layer is zero; and
performing one of:
(i) based on a determination that the length of the slice segment header extension associated with the current picture is zero, determining that a first syntax element indicative of one or more most significant bits (MSBs) of a picture order count (POC) value associated with the current picture is not present in the bitstream, and based on the determination that the first syntax element is not present in the bitstream, decoding the current picture without receiving, in the bitstream, the first syntax element indicative of the one or more MSBs of the POC value associated with the current picture, or (ii) based on a determination that the length of the slice segment header extension associated with the current picture is not zero, determining whether one or more MSBs of a POC value associated with the current picture are required to be present in the bitstream, and based on a determination that the one or more MSBs of the POC value associated with the current picture are required to be present in the bitstream, decoding the current picture at least in part by receiving, in the bitstream, the first syntax element indicative of the one or more MSBs of the POC value associated with the current picture.

13. The method of claim 12, further comprising determining whether that the length of the slice segment header extension is zero based on a second syntax element indicative of the length of the slice segment header extension.

14. The method of claim 12, further comprising determining whether that the length of the slice segment header extension is zero based on a third syntax element indicative of whether the slice segment header extension associated with the current picture is present in the bitstream.

15. The method of claim 12, further comprising determining that the first syntax element associated with the current picture is not present in the bitstream based at least in part on whether the current picture is a clean random access (CRA) picture or a broken link access (BLA) picture.

16. The method of claim 12, further comprising:
determining whether the current picture is a CRA picture or a BLA picture;
determining that the one or more MSBs of the POC value are required to be present in the bitstream based on a determination that the current picture is a CRA picture or a BLA picture; and
regardless of the determination that the one or more MSBs of the POC value are required to be present in the bitstream, determining that the first syntax element is not present in the bitstream based on the determination that the length of the slice segment header extension is zero.

17. The method of claim 16, further comprising determining whether the length of the slice segment header extension is zero based on a second syntax element indicative of the length of the slice segment header extension.

18. The method of claim 12, further comprising setting a parameter to zero to indicate that the first syntax element is not present in the bitstream.

19. The method of claim 12, further comprising decoding the video layer based at least in part on a second syntax element indicative of one or more MSBs of a POC value associated with another picture based on a determination that a length of another slice segment header extension associated with said another picture is not zero.

20. The method of claim 19, wherein the second syntax element is provided in said another slice segment header extension.

21. The method of claim 19, further comprising processing the one or more MSBs of the POC value associated with said another picture in the bitstream based on a determination that the one or more MSBs of the POC value associated with said another picture are required to be present in the bitstream.

22. The method of claim 12, further comprising determining that the first syntax element is not present in the bitstream based on a determination that the one or more MSBs of the POC value associated are not required to be present in the bitstream.

23. A non-transitory computer readable medium comprising code that, when executed, causes an apparatus to:
store video data associated with a video layer of a bitstream having a current picture;
determine whether a length of a slice segment header extension associated with the current picture is zero;
based on a determination that the length of the slice segment header extension associated with the current picture is zero, determine that a first syntax element indicative of one or more most significant bits (MSBs) of a picture order count (POC) value associated with the current picture is not present in the bitstream; and
based on the determination that the first syntax element is not present in the bitstream, decode the current picture without receiving, in the bitstream, the first syntax element indicative of the one or more MSBs of the POC value associated with the current picture.

24. The computer readable medium of claim 23, wherein the code further causes the apparatus to determine whether the length of the slice segment header extension is zero based on a second syntax element indicative of the length of the slice segment header extension.

25. The computer readable medium of claim 23, wherein the code further causes the apparatus to determine whether the length of the slice segment header extension is zero based on a third syntax element indicative of whether the slice segment header extension associated with the current picture is present in the bitstream.

26. The computer readable medium of claim 23, wherein the code further causes the apparatus to:
determine whether the current picture is a clean random access (CRA) picture or a broken link access (BLA) picture;
determine that the one or more MSBs of the POC value are required to be present in the bitstream based on a determination that the current picture is a CRA picture or a BLA picture; and
regardless of the determination that the one or more MSBs of the POC value are required to be present in the bitstream, determine that the first syntax element is not present in the bitstream based on the determination that the length of the slice segment header extension is zero.

27. A video coding device configured to decode video information in a bitstream, the video coding device comprising:
means for storing video data associated with a video layer having a current picture;
means for determining whether a length of a slice segment header extension associated with the current picture is zero;
means for determining that a first syntax element indicative of one or more most significant bits (MSBs) of a picture order count (POC) value associated with the current picture is not present in the bitstream based on a determination that the length of the slice segment header extension associated with the current picture is zero; and
means for decoding the current picture without receiving, in the bitstream, the first syntax element indicative of the one or more MSBs of the POC value associated with the current picture based on the determination that the first syntax element is not present in the bitstream.

28. The video coding device of claim 27, further comprising means for determining whether the length of the slice segment header extension is zero based on a second syntax element indicative of the length of the slice segment header extension.

29. The video coding device of claim 27, further comprising means for determining whether the length of the slice segment header extension is zero based on a third syntax element indicative of whether the slice segment header extension associated with the current picture is present in the bitstream.

30. The video coding device of claim 27, further comprising:
- means for determining whether the current picture is a clean random access (CRA) picture or a broken link access (BLA) picture;
- means for determining that the one or more MSBs of the POC value are required to be present in the bitstream based on a determination that the current picture is a CRA picture or a BLA picture; and
- means for determining, regardless of the determination that the one or more MSBs of the POC value are required to be present in the bitstream, that the first syntax element is not present in the bitstream based on the determination that the length of the slice segment header extension is zero.

* * * * *